April 11, 1950     H. L. MYERS     2,503,588
TROLLEY COLLECTOR ASSEMBLY
Filed June 28, 1945     2 Sheets-Sheet 1

INVENTOR
Harry L. Myers

April 11, 1950 H. L. MYERS 2,503,588
TROLLEY COLLECTOR ASSEMBLY
Filed June 28, 1945 2 Sheets-Sheet 2

INVENTOR.
BY Harry L Myers

Patented Apr. 11, 1950

2,503,588

UNITED STATES PATENT OFFICE 2,503,588

TROLLEY COLLECTOR ASSEMBLY

Harry L. Myers, Cleveland Heights, Ohio

Application June 28, 1945, Serial No. 602,058

4 Claims. (Cl. 191—57)

My invention relates to improvement in electric crane collector assembly, where the numerous closely spaced trolley wires having no intermediate suspension devices are dead ended on opposite ends of the crane bridge. Such wires are sometimes known as cross trolleys. In this type of trolley wire installation, an inverted collector, of the powdered metallurgy type, works on the top side of the trolley wire in conjunction with a like collector that works on the bottom side of the same wire. To conserve space and allow for close trolley wire spacing, they are constructed to alternate right and left, and the objects of my improvement are:

First, to provide necessary carrying capacity for 220 volt 40 H. P. A. C. motors, where starting current momentarily reaches 600 amperes, and hundreds of operations are necessary each day.

Second, to eliminate over heating.

Third, to provide a fixed amount of contact pressure at all times between collectors and trolley wire irrespective of carriage location.

Fourth, to provide adjustable spring tension to take care of collector wear in a simplified, practical, accessible method.

Fifth, to eliminate all collector arcing and trolley wire burning and assure long wear to the trolley wire and collector.

Sixth, to perfect a method of operation that collectors of powdered metallurgy composition, containing graphite and metals, can more satisfactorily be used on any trolley wire that does not have any intermediate support attached to trolley wire.

In carrying my invention into practice, I provide a collector assembly comprising a frame member, a pair of collector units, one of which is rigidly secured to the frame member and the other of which is pivotally connected to the frame member and yieldably associated therewith to permit limited yieldable movement of the latter unit relative to the frame axially of the pivotal axis.

I attain these objects by mechanism illustrated in the accompanying drawing, in which.

Figure 3:
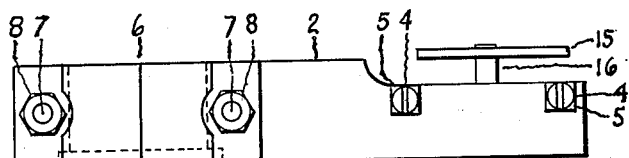

Figure 3 is a side view of the over collector holder located to the right of stationary holder and with the collector element removed. Figure 3 can be called a right hand over and under collector assembly. They are to be used in rights and lefts to accommodate closely spaced trolley wires.

Figure 4:
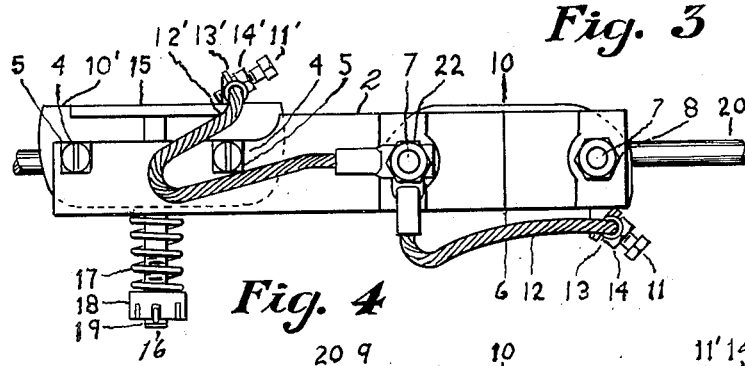

Figure 4 is a side view of a left hand collector assembly showing position of collector and shunts in proper location and the position they work on the trolley wire.

Figure 5:
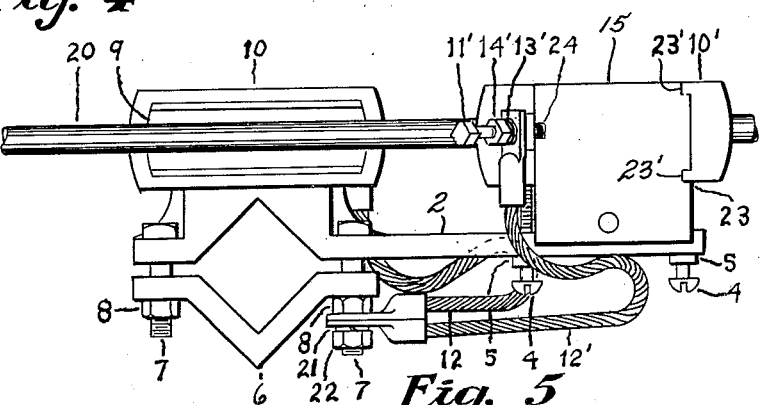

Figure 5 is a top plan view of the right hand collector assembly.

Figure 6:
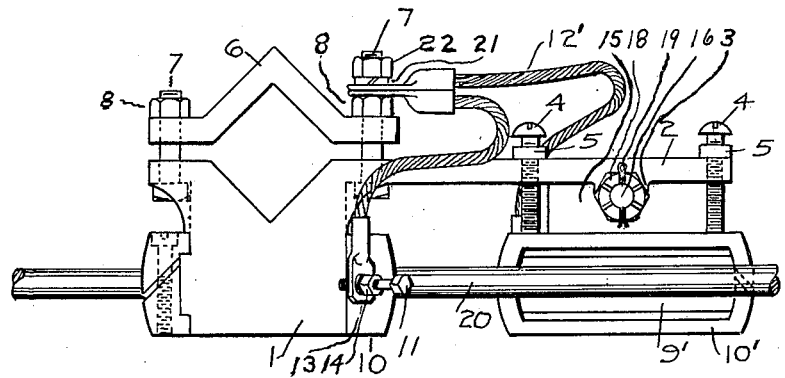

Figure 6 is a bottom plan view of the same.

Figure 7:
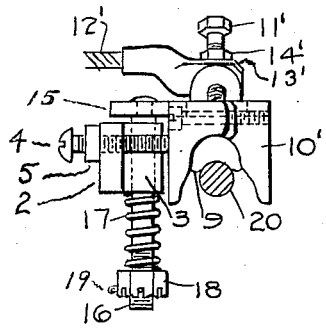

Figure 7 is an end view of the same, looking toward right hand end of Figure 5, omitting the clamp elements.

Figures 1, 3, 6 and 7 are right hand collector assembly, and Figure 4 is left hand collector assembly. If in Figure 3 the collectors, shunts, and trolley wire were shown as they are in Figure 4, then Figures 3 and 4 would show both right and left hand collector assemblies as applied in use.

Similar numerals refer to similar parts throughout the several views.

The collector assembly of my invention comprises a frame member 2 having rigidly associated therewith a collector unit consisting of a holder 1 to which is detachably connected a shoe 10 constructed in accordance with United States Patent No. 2,044,886, in which is secured a grooved contact element 9 constructed in accordance with United States Patent No. 2,185,270. A second collector unit is pivotally secured to the frame 2 and consists of a holder 15 to which is detachably connected a shoe 10' of the same construction as shoe 10, and the shoe 10' has secured therein a grooved contact element 9' of like construction to the contact element 9.

Figure 2:
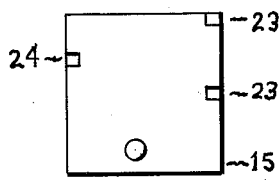
Figure 2 is a detail view of the over collector support.
Figure 1:
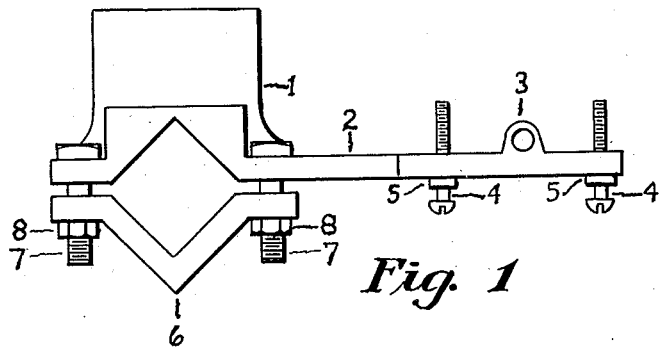
Figure 1 is a plan view of the main frame supporting parts with collector elements removed.

The shoes 10 and 10' are each formed with mitered male lugs 23', see Figure 5, which fit into mitered female recesses 23 formed in one side of each of the holders 1 and 15 as seen in Figure 2. Each of the shoes 10 and 10' also is provided with a respective bolt 11 which is angularly disposed as seen in Figures 5 and 6 and the inner end of which is adapted to engage a mitered slot 24 provided in each of the holders 1 and 15, as also seen in Figure 2. In order to engage the shoe 10 or 10' with the holder 1 or 15, the bolt 11 is first backed out, and then the end of the shoe that has the lugs 23' is engaged over the holder so that the lugs are received in the recesses 23 of the holder. Then the bolt end of the shoe is pushed over the holder and the bolt tightened up so that its inner end is engaged in the recess 24. The bolts 11 for each shoe serve to secure the shunts 12 by means of lock washer 13 and nut 14.

The holder 1 is clamped to the conventional perpendicular insulated collector arm at the proper elevation by means of clamp 6, bolts 7, and nuts 8.

For the pivotal connection of the said second collector unit to the frame 2 the latter is provided with a bearing opening 3 which receives the shaft 16 secured to the holder 15. The lower end of the shaft 16 is threaded and has holes drilled to receive a cotter key. Spring 17 works over shaft 16 and compressed to the desired contact tension by slotted nut 18 and locked in position with cotter key 19, the spring 17 being compressed between the nut 18 and the frame 2, whereby to bias the holder 15 for movement axially of the shaft 16 toward the frame 2. The shoes 10 and 10' are arranged on their respective holders 1 and 15 so that the grooved contact elements 9 and 9' have their grooves facing toward one another for engagement with opposite sides of a trolley wire to be received in said grooves. When the trolley wire is so received in the grooves of the contact elements, the same are maintained in tight engagement with the wire by reason of the spring action on the collector unit which includes the holder 15 and shaft 16.

Alignment screws 4 and 4 are adjusted against the side of the shoe 10 for proper alignment of the contact element carried thereby with the trolley wire 20, said adjusting screws 4—4 having threaded cooperation with the arm 3. Jam nuts 5 hold screws 4—4 in place. The opposite ends of the shunts 12 are placed on one of the bolts 7 or 7 with the motor lead or circuit wire that it is to supply and secured with lock washer 21 and nut 22.

The two-piece collector shown in the drawing consists of a renewable insert collector, U. S. Patent No. 2,185,270 which is held in the shoe, U. S. Patent No. 2,044,886. The above collector used singly on 40 H. P. 220 volt A. C. crane operation heats excessively, but when used in conjunction with the under and over collector assembly herein is far superior to the trolley wheel or bronze shoe collectors, and through the use of the under and over collector assembly and the use of powdered metallurgy collectors, the life of the trolley wire is greatly increased.

I am aware that twin wheel collectors are in use, but they depend on the weight of the wire for contact. I, therefore, do not claim the use of two collectors on the same trolley wire broadly.

I claim:

1. A collector assembly of the class described comprising a frame member, a pair of collector units, each unit including a contact element having a groove therein adapted to receive a trolley wire in contact therewith, said contact elements being arranged to engage opposite sides of the trolley wire in opposed relation, one of said units being rigidly secured to said frame and the other of said units having pivotal connection with said frame, and means associated with said frame and cooperating with said latter unit for adjusting the same about the axis of said pivotal connection to a desired fixed position, and yieldable means associated with said latter unit and said frame and permitting limited yieldable movement of said latter unit relative to said frame in the direction of said axis, the pivotal connection including a pivot shaft and the yieldable means comprising a spring member mounted on said shaft and interposed between said latter unit and said frame.

2. A collector assembly of the class described comprising a frame member, a pair of collector units, each unit including a contact element having a groove therein adapted to receive a trolley wire in contact therewith, said contact elements being arranged to engage opposite sides of the trolley wire in opposed relation, one of said units being rigidly secured to said frame and the other of said units having pivotal connection with said frame, and means associated with said frame and cooperating with said latter unit for adjusting the same about the axis of said pivotal connection to a desired fixed position, and yieldable means associated with said latter unit and said frame and permitting limited yieldable movement of said latter unit relative to said frame in the direction of said axis, the said units being disposed so that the respective contact elements are engageable with a single trolley wire from opposite directions and wherein one of the said units is disposed so that its contact element may engage a different portion of the same wire than that engaged by the contact element of the first unit.

3. A collector assembly of the class described comprising a frame, a pair of collector units, each unit including a contact element having a groove therein adapted to receive a trolley wire in contact therewith, said contact elements being arranged to engage opposite sides of the trolley wire in opposed relation, one of said units being rigidly secured to said frame and the other of said units having a pivotal connection with said frame, the axis of said pivotal connection being disposed so as to permit movement of the latter unit in a direction transverse to the axis of the groove of the contact element of said first unit, means associated with said frame and cooperating with said latter unit for adjusting the same about the axis of the said pivotal connection to a desired fixed position and yieldable means associated with said latter unit and said frame and permitting limited yieldable movement of said latter unit relative to said frame in the direction of said axis, combined with yieldable means associated with the said latter unit and said frame and permitting limited yieldable movement of the said latter unit relative to said frame in the direction of said axis.

4. A collector assembly of the class described comprising a frame member, a pair of collector units, each unit including a contact element having a groove therein adapted to receive a trolley wire in contact therewith, said contact elements being arranged to engage opposite sides of the trolley wire in opposed relation, one of said units being rigidly secured to said frame and the other of said units having pivotal connection with said frame, and means associated with said frame and cooperating with said latter unit for adjusting the same about the axis of said pivotal connection to a desired fixed position, and yieldable means associated with said latter unit and said frame and permitting limited yieldable movement of said latter unit relative to said frame in the direction of said axis, the said units being disposed so that the respective contact elements are engageable with a single trolley wire from opposite directions and wherein one of the said units is disposed so that its contact element may engage a different portion of the same wire than that engaged by the contact element of the first unit, said pivotal connection including a pivot shaft and the yieldable means comprising a spring member mounted on said shaft interposed between said latter unit and said frame, the axis of said shaft being disposed so as to permit pivotal movement of said latter unit in a direction transverse to the axis of the groove of the contact element of said first unit.

HARRY L. MYERS.

REFERENCES CITED

The following references are of record in the file of this patent:

UNITED STATES PATENTS

| Number | Name | Date |
|---|---|---|
| 576,721 | Caffrey | Feb. 9, 1897 |
| 1,286,103 | Reed | Nov. 26, 1918 |
| 1,404,496 | Vallino | Jan. 24, 1922 |
| 1,466,893 | Dunbar | Sept. 4, 1923 |
| 1,612,648 | Pollard | Dec. 28, 1926 |
| 2,044,886 | Larsson | June 23, 1936 |

FOREIGN PATENTS

| Number | Country | Date |
|---|---|---|
| 371,297 | Italy | May 19, 1939 |
| 447,860 | Germany | July 14, 1927 |